May 23, 1933. I. VARGA 1,910,414

TOOTH CLEANING APPLIANCE WITH RESILIENT CLEANING MEMBERS

Filed May 2, 1931

Inventor:
Imre Varga.

By, Chatwin & Company. Attys.

Patented May 23, 1933

1,910,414

UNITED STATES PATENT OFFICE

IMRE VARGA, OF BUDAPEST, HUNGARY

TOOTH CLEANING APPLIANCE WITH RESILIENT CLEANING MEMBERS

Application filed May 2, 1931, Serial No. 534,589, and in Germany March 19, 1931.

The invention relates to a tooth cleaning appliance the cleaning organs of which are subdivided in ribs, and are more particularly made of rubber. According to the invention the rubbing organ is made of several crosswise arranged rows, which are independent from each other. Crosswise ribs are provided between said cross rows. The surface of the longitudinal rib is of a concave shape thus conforming to the convex surface of the teeth. The longitudinal and crosswise rib members are so arranged, that they divide the cleaning organ in parts which correspond to the size of the teeth. The crosswise ribs are preferably also designed with a concave surface to enable them to thoroughly penetrate into all the interstices between the teeth, with a tooth cleaning appliance according to the invention the teeth can be thoroughly cleansed without in any way damaging the gums.

It is known per se to provide tooth cleaning appliances with a continuous friction surface with recesses which correspond to the form of the teeth, or to give the crosswise ribs concave top surfaces.

Figure 1:
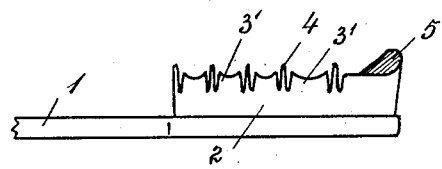
Figure 2:
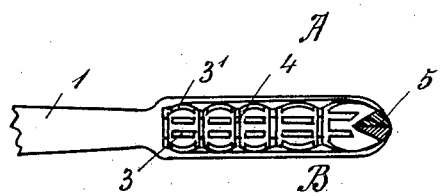
Figure 3:
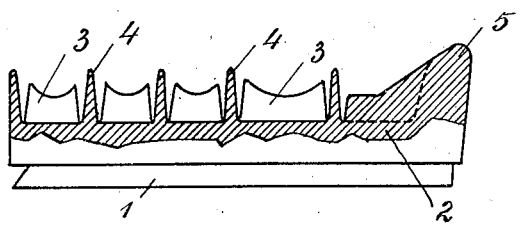
Figure 4:
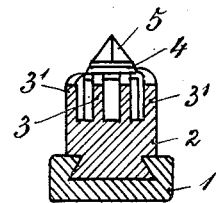

The accompanying drawing shows an embodiment of the invention as an example. Figure 1 is a side view of the teeth cleaning appliance, Fig. 2 is a top view thereof. Fig. 3 is a longitudinal section thereof on a larger scale. Fig. 4 is a cross section according to the line A—B of Fig. 2, also on a larger scale.

The rubber block 2 is fixed and dovetailed to the handle 1, the top part of this rubber block which forms the cleaning member which replaces the usual brush, consists of longitudinal ribs 3 which are disposed adjacently and consecutively and are independent from one another, and of cross ribs 4 arranged between the cross rows of the longitudinal ribs. The top edge of both the longitudinal and crosswise ribs is of a concave shape. The cross ribs 4 separating the longitudinal ribs are shorter than the width of the block 2, their concave top edge reaches above the longitudinal ribs 3. Their front and rear faces are roughened so as to increase the cleaning action by means of fluting or grooving. The distance between the cross ribs 4 corresponds to the size of the teeth, thus subdividing the cleaning or rubbing member into parts with a concave surface, which correspond in size to the size of the teeth and which fit the convex shape of the lip parts of the face.

The distance between the cross ribs may vary according to the varying size of the teeth. The outer longitudinal rib members 3' bordering on said cross ribs are outwardly of a convex shape. This convex line corresponds to the arcuate shape of the free edge of the gums, and serves the purpose to enable the ribs to reach the highest and lowest parts of the teeth where they are joined to the gums. The convex interstices between the teeth can be cleaned by means of the cross ribs 4 having a concave top edge without any fear of damaging the gums, as these cross ribs cannot reach the said gums because of their being short. A wedge shaped longitudinal rib 5 with inclined upper edge lines protrudes out of the last part of the cleaning member, and above the top edges of the cross ribs, the sides of this longitudinal rib 5 are fluted similarly to the cross members. This rib is very suitable by reason of its characteristic shape for cleaning the front surface of the last tooth, the chewing surface of all the teeth and of the inward surfaces and interstices of the teeth. It is also very suitable for cleaning the deeper interstices between the teeth.

I claim:—

1. A tooth cleaning appliance having cleaning members which are resilient and are subdivided into ribs the rubbing or cleaning member consisting of several cross rows of adjacently disposed longitudinal ribs having concave top edges, and crosswise ribs provided between said cross rows, these cross ribs also having a concave top edge, the concavity of the longitudinal rib corresponding to the convex part of the teeth, turned in the direction of the lips.

2. A tooth cleaning appliance according to claim 1, characterized by the fact that the cross ribs are shorter than the full width of the cleaning member and that their upper edges surpass the top edge of the longitudinal ribs.

3. A tooth cleaning appliance as claimed in claim 1 including cross ribs and longitudinal ribs, said cross ribs separating said longitudinal ribs the distance between said cross ribs varying thereby to accommodate teeth of different sizes.

4. A tooth cleaning appliance as claimed in claim 1 including, a wedge shaped longitudinal rib upon one of said cleaning members and protruding from the front end of said cleaning member above the upper edge of the cross ribs, said longitudinal rib having an oblique top edge line.

IMRE VARGA.